(12) United States Patent
Dukellis et al.

(10) Patent No.: US 11,722,575 B2
(45) Date of Patent: *Aug. 8, 2023

(54) DYNAMIC APPLICATION CONTENT ANALYSIS

(71) Applicant: Google LLC, Mountain View, CA (US)

(72) Inventors: John Nicholas Dukellis, Los Altos, CA (US); Tuna Toksoz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,462

(22) Filed: Jun. 27, 2022

(65) Prior Publication Data

US 2022/0360638 A1 Nov. 10, 2022

Related U.S. Application Data

(63) Continuation of application No. 17/148,357, filed on Jan. 13, 2021, now Pat. No. 11,388,254, which is a
(Continued)

(51) Int. Cl.
*H04L 29/08* (2006.01)
*H04L 67/303* (2022.01)
(Continued)

(52) U.S. Cl.
CPC ........ *H04L 67/303* (2013.01); *G06F 16/9014* (2019.01); *G06F 16/958* (2019.01);
(Continued)

(58) Field of Classification Search
CPC ................. G06F 21/10; G06F 21/6218; G06F 2221/0706; H04L 9/32; H04L 51/212;
(Continued)

(56) References Cited

U.S. PATENT DOCUMENTS 8,234,168 B1 7/2012 Ruiz et al.
8,255,873 B2 8/2012 Lazier et al.
(Continued)

FOREIGN PATENT DOCUMENTS

JP 2015-079101 4/2015
WO WO 2018143990 8/2018

OTHER PUBLICATIONS

Notice of Allowance in Japanese Appln. No. 2020-567968, dated Nov. 14, 2022, 5 pages (with English translation).
(Continued)

*Primary Examiner* — Chirag R Patel
(74) *Attorney, Agent, or Firm* — Fish & Richardson P.C.

(57) ABSTRACT

Methods, systems, and apparatus, including an apparatus for analyzing content that is displayed within an application (e.g., a native application) on a client device and making decisions regarding the presentation of content within the application. In one aspect, a process includes identifying an event occurring within the application. The event can be indicative of a display of content by the application. The content to be displayed is received from the application. Information representative of the content is sent to a server. A response is received from the server. The response is indicative of the suitability of the content for display within the application.

20 Claims, 3 Drawing Sheets

Related U.S. Application Data continuation of application No. 16/660,249, filed on Oct. 22, 2019, now Pat. No. 10,917,494.

(60) Provisional application No. 62/800,172, filed on Feb. 1, 2019.

(51) Int. Cl.
  *G06F 16/958* (2019.01)
  *G06F 16/901* (2019.01)
  *G06F 16/9535* (2019.01)
  *H04L 67/50* (2022.01)
  *G06F 21/00* (2013.01)
  *G06F 21/10* (2013.01)

(52) U.S. Cl.
  CPC .......... *G06F 16/9535* (2019.01); *G06F 21/00* (2013.01); *G06F 21/10* (2013.01); *H04L 67/535* (2022.05)

(58) Field of Classification Search
  CPC ............ H04L 2209/60; H04N 21/4627; G06Q 20/1235
  See application file for complete search history.

(56) References Cited

U.S. PATENT DOCUMENTS

| | | | |
|---|---|---|---|
| 8,386,314 B2 | 2/2013 | Kirkby et al. | |
| 9,053,416 B1 | 6/2015 | De Leo et al. | |
| 9,246,875 B2 | 1/2016 | Mityagin | |
| 9,607,088 B2 | 3/2017 | Chun | |
| 11,113,757 B1 * | 9/2021 | Latorre | G06Q 50/01 |
| 11,233,776 B1 * | 1/2022 | Muddapappu | H04L 63/102 |
| 2003/0126267 A1 | 7/2003 | Gutta et al. | |
| 2008/0040748 A1 | 2/2008 | Miyaki | |
| 2009/0077223 A1 | 3/2009 | Bachiri et al. | |
| 2013/0013705 A1 | 1/2013 | White et al. | |
| 2014/0189047 A1 | 7/2014 | Strobl et al. | |
| 2016/0112760 A1 | 4/2016 | Kosseifi et al. | |
| 2016/0140611 A1 | 5/2016 | Schler et al. | |
| 2016/0253710 A1 | 9/2016 | Publicover et al. | |
| 2016/0323307 A1 | 11/2016 | Savant | |
| 2020/0169787 A1 | 5/2020 | Pearce et al. | |
| 2020/0372184 A1 | 11/2020 | Meirosu | |
| 2021/0136174 A1 | 5/2021 | Dukellis et al. | |

OTHER PUBLICATIONS

International Preliminary Report on Patentability in International Appln. No. PCT/US2019/057541, dated Jul. 27, 2021, 10 pages.

International Search Report and Written Opinion in International Application No. PCT/US2019/057541, dated Jan. 20, 2020, 17 pages.

makeitbloom.com [online], "How to Keep Your Ads off Offensive Sites," Jul. 2017, retrieved on Oct. 21, 2019, retrieved from URL <https://www.makeitbloom.com/blog/how-to-keep-your-ads-off-offensive-sites/>, 3 pages.

Office Action in Indian Appln. No. 202027052365, dated Dec. 10, 2021, 6 pages (with English translation).

Office Action in Japanese Appln. No. 2020-567968, dated Jul. 4, 2022, 8 pages (with English translation).

Office Action in Japanese Appln. No. 2020-567968, dated Nov. 29, 2021, 9 pages (with English translation).

Office Action in Korean Appln No. 10-2020-7034908, dated Mar. 31, 2022, 23 pages (with English translation).

Office Action in Korean Appln No. 10-2020-7034908, dated Aug. 17, 2022, 5 pages (with English translation).

Office Action in Korean Appln. No. 10-2022-7032466, dated May 20, 2023, 16 pages (with English translation).

* cited by examiner

DYNAMIC APPLICATION CONTENT ANALYSIS

CROSS-REFERENCE TO RELATED APPLICATIONS

This application is a continuation application of U.S. patent application Ser. No. 17/148,357, filed on Jan. 13, 2021, which is a continuation application of, and claims priority to, U.S. patent application Ser. No. 16/660,249, now U.S. Pat. No. 10,917,494, filed on Oct. 22, 2019, which application claims priority to U.S. Provisional Patent Application No. 62/800,172, filed Feb. 1, 2019. The disclosure of each of the foregoing applications is incorporated herein by reference.

BACKGROUND

The Internet provides access to a wide variety of resources. For example, video and/or audio files, as well as web pages for particular subjects or particular news articles are accessible over the Internet. The resources can present content related to the particular subjects or particular news articles. Content can also be accessed using applications, such as native applications developed for a particular platform or particular type of device.

SUMMARY

This specification describes technologies relating to analyzing dynamic content that is displayed in an application and selecting additional content for presentation within the application based on the analysis.

Techniques exist for analyzing content that is displayed within a web browser on a client device. For instance, a server may retrieve content from its source before it is displayed on the client device, for example by requesting the content from a web server. The server can then analyze the retrieved content, for example to identify whether it contains undesirable content such as malicious code, adult material, hate speech, etc.

However, it is technically challenging to analyze content that is displayed within an application other than a web browser. Unlike a web browser, it is not necessarily possible to identify the source of the content before it is displayed within the application. There thus exists a possibility of a "bad actor", such as a malicious application developer, distributing an application that retrieves undesirable content and displays that content to a user. This problem is compounded by the existence of dynamic content. Dynamic content may be frequently updated and/or be customized for a particular user, or may otherwise differ when displayed at different times or by different client devices. For example, it can be difficult to analyze dynamic content without causing unacceptable delays in rendering that content within the application.

It may also not be possible to obtain application content directly by a server outside of the application itself. For example, some content may be customized for a user that is logged into the application at a client device. Such content would not be available outside the application. Some content is requested by the application when the application is opened or loads content and would only be available for analysis when the application is live and has requested the content. For example, the application may request content from a web site to present within the application. As the application is not tied to a specific Uniform Resource Locator (URL), like a web page, there is no deterministic source of the data. In addition, an application can present content when offline (e.g., not connected to a network from which the application can obtain content), making it more difficult to analyze content of the application relative to web content presented in web browsers.

It may also be ineffective to obtain content that will be presented in applications from application publishers and analyze the content prior to the content being presented in the application. For example, a bad actor can provide misleading content for analysis, while providing different content in the application itself.

The present disclosure allows analysis of content that is displayed within an application (e.g., other than a traditional browser) on a client device. Specifically, the client device identifies when content is being displayed (or is about to be displayed) within the application, and sends the content (or a hash value thereof) to a server for analysis of the content's suitability. Depending on the server's analysis of the content, the client device may make further decisions relating to the display of the content within the application. In this manner, content to be displayed within an application can be quickly analyzed, without introducing unacceptable delays in rendering the content. The secrecy of the content may be preserved by sending a hash value, rather than the content itself, to the server for analysis.

In addition, other content, e.g., digital components, can be selected for presentation with the content. As the content of applications can be dynamic (e.g., being changed frequently), a determination can be made whether the content has changed relative to previously analyzed content. If not, the previous analysis of the content can be used to select the digital components. If the content has changed, the content may need to be analyzed prior to providing some digital components, e.g., digital components that have one or more selection criteria that indicate that the digital components may not be presented with particular types of content, such as adult material, hate speech, etc. As this analysis may take time, digital components that can be presented with any type of content, e.g., including adult material or hate speech, may be provided for presentation, while digital components that include restrictions on the type of content with which they can be presented can be deemed ineligible for presentation. This reduces the latency in providing and presenting digital components, while also ensuring compliance with the selection criteria for the digital components and preventing such digital components from being presented with unsuitable content.

In general, one innovative aspect of the subject matter described in this specification can be embodied in methods for analyzing content to be displayed within an application on a client device. The methods can be being performed by a client device and include identifying an event occurring within the application. The event is indicative of a display of content by the application. The content to be displayed is received from the application. Information representative of the content is sent to a server. A response is received from the server. The response is indicative of the suitability of the content for display within the application. Other implementations of this aspect include corresponding apparatus, systems, and computer programs, configured to perform the aspects of the methods, encoded on computer storage devices.

These and other implementations can each optionally include one or more of the following features. In some aspects, the information representative of the content includes a hash value generated by performing a hash function on at least a portion of the content.

Some aspects can include preventing display of the content within the application when the response indicates that the content is not suitable for display. Some aspects can include receiving additional content when the response indicates that the content is suitable for display within the application and displaying the additional content on the client device when the content is displayed within the application. The event can be a screen update event.

In general, another innovative aspect of the subject matter described in this specification can be embodied in methods that include receiving, from a client device, information representative of present content displayed by an application that is executed at the client device and not directly accessible by the one or more data processing apparatus. One or more data processing apparatus determine, based on the received information, whether the present content displayed by the application has changed from previous content that was previously displayed by the application at one of more client devices. The one or more data processing apparatus respond to the information based on whether the present content has changed from the previous content, including, in response to determining that the present content has not changed from the previous content obtaining, for the previous content, one or more labels that each indicate a content category to which at least a portion of the previous content was assigned. The one or more labels are assigned to the previous content based on a previous analysis of the previous content that (i) was performed prior to the information being received, and (ii) indicates that the previous content is whitelisted for presentation of restricted digital components. The responding also includes selecting, based on the one or more labels, a set of restricted digital components that are only eligible to be presented with content that has been assigned the one or more labels indicating that the content is whitelisted for presentation of restricted digital components, selecting, from the set of restricted digital components, one or more of the restricted digital components for presentation at the application with the present content; and providing the selected one or more restricted digital components to the client device from which the information was received. In response to determining that the present content has changed, an unrestricted digital component that is eligible for presentation is selected irrespective of whether content is whitelisted rather than the one or more of the restricted digital components. Other implementations of this aspect include corresponding apparatus, systems, and computer programs, configured to perform the aspects of the methods, encoded on computer storage devices.

These and other implementations can each optionally include one or more of the following features. In some aspects, selecting the unrestricted digital component can include identifying a set of unrestricted digital components that are eligible for presentation irrespective of whether content is whitelisted and selecting, from the set of unrestricted digital components, the unrestricted digital component based on one or more distribution criteria for the unrestricted digital component.

Some aspects can include analyzing the present content of the application in response to determining that the present content has changed from the previous content and assigning, to the present content and based on the analyzing, at least one label that indicates that the present content is whitelisted for presentation of restricted digital components.

In some aspects, at least one of the one or more labels indicates that the present content has been classified as including a given category of unsuitable content. Selecting the set of restricted digital components can include determining that a given digital component has one or more selection criteria that indicate that the given digital component is not eligible to be presented with content that includes the given category of unsuitable content and determining to not include the given digital component in the set of restricted digital components in response to determining that the given digital component has one or more selection criteria that indicate that the given digital component is not eligible to be presented with content that includes the given category of unsuitable content.

In some aspects, the information representative of the present content includes a hash value generated by performing a hash function on at least a portion of the present content and determining, based on the received information, whether the present content has changed from the previous content comprises comparing the hash value to a previous hash value for the previous content.

In some aspects, the information representative of the present content includes multiple hash values, and wherein each hash value represents a portion of the present content displayed by the application. In some aspects, the application provides the information representative of content displayed by the application in response to detecting a screen update event.

The subject matter described in this specification can be implemented in particular embodiments so as to realize one or more of the following advantages. By determining whether application content has changed, the selection of additional content, e.g., digital components, for presentation with the application content can be made significantly faster than analyzing the application content at content selection time. This reduces the latency in providing and presenting the content, which can also reduce errors that occur within applications while waiting for the additional content. By determining whether the application content has changed at content selection time, the system can ensure that restricted digital components are not presented with unsuitable content even for applications that present dynamically changing content. By using the identification of an event occurring within the application to trigger the sending of information representative of content to a server, the content can be analyzed by the server even though the content may not be directly accessible to the server. Further, the likelihood of unsuitable content being displayed within an application can be reduced, without introducing significant latency when displaying suitable content.

Various features and advantages of the foregoing subject matter are described below with respect to the figures. Additional features and advantages are apparent from the subject matter described herein and the claims.

DETAILED DESCRIPTION

In general, systems and techniques described herein can analyze content that is displayed within an application (e.g., a native application) on a client device. The systems can then make decisions regarding the presentation of content within the application. For example, additional content can be selected for presentation within the application based on the analysis.

Additional content, such as digital components, can have one or more associated selection criteria that indicate types, categories, and/or ratings of content with which the additional content is not to be presented. For example, a publisher of digital components may prohibit its digital components from being presented with content categorized as hate speech or that includes violent images. As content presented within applications is often dynamic, e.g., customized for a particular user, updated frequently, or requested from other sources when the application is live, it can be difficult to accurately determine whether application's content includes text, images, or other content with which some additional content is not eligible to be presented. To make faster decisions regarding what additional content can be presented with the content of the application, the systems and techniques described herein can select additional content based on whether the present content presented by the application has changed from previous content presented by the application.

For example, a system can receive an indication of present content displayed (or that is going to be displayed) by an application on a client device. The system can determine whether the present content has changed from previous content that was presented by the application either at the same client device or at a different client device. If the present content is the same as the previous content, the results of a previous analysis of the previous content can be used to select additional content for presentation within the application. For example, additional content that is eligible for presentation with the previous content can be selected based on the previous analysis. If the present content is different from the previous content, the system can select unrestricted content that is eligible for presentation irrespective of the subject matter or rating of the present content. In this way, the system does not have to wait for the current content to be analyzed prior to selecting additional content for presentation with the current content, resulting in reduced latency in selecting and presenting content.

Figure 1:
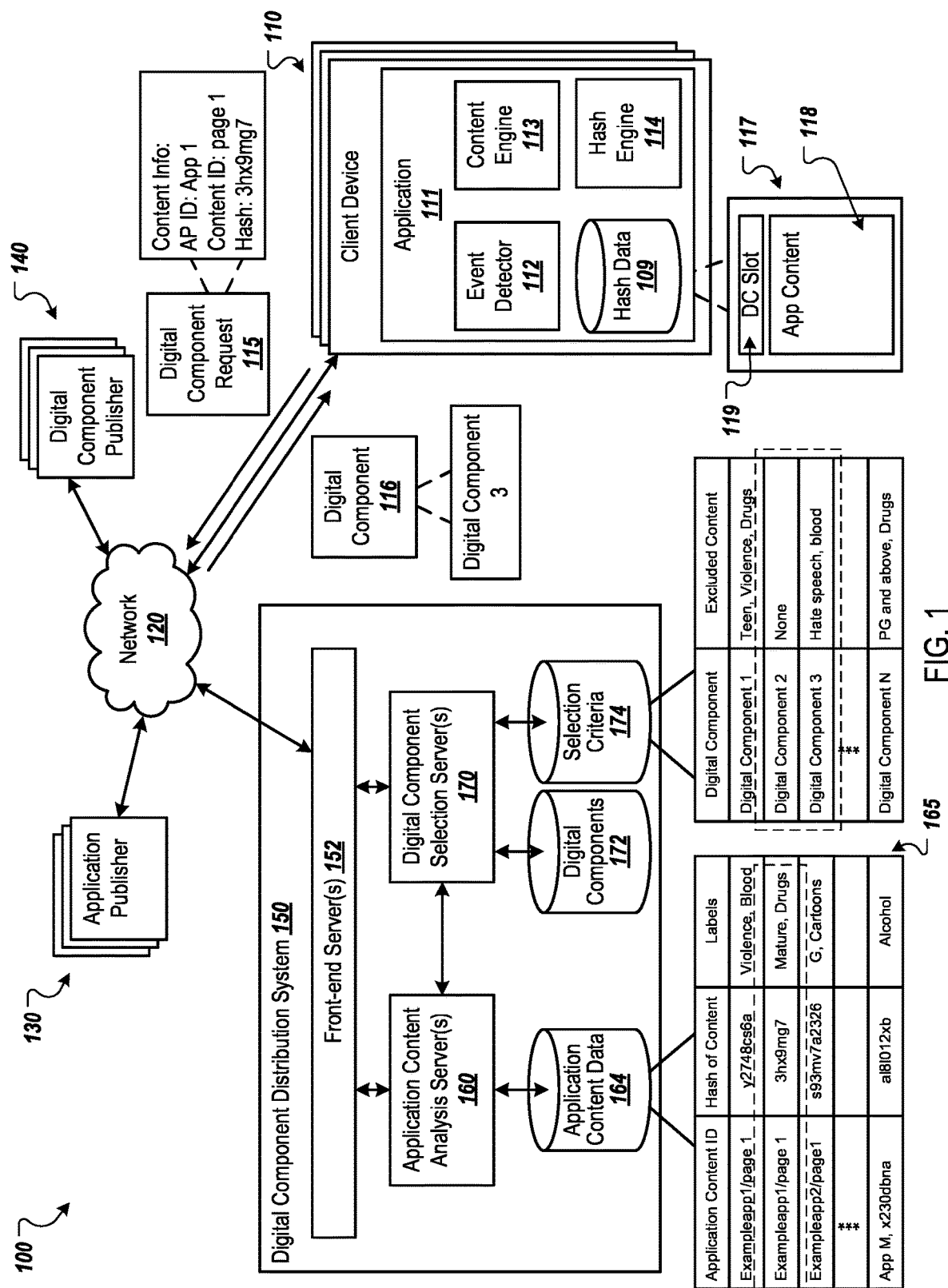
FIG. 1 is a block diagram of an environment in which an example digital component distribution system analyzes content of applications and distributes digital components for presentation in the applications based on the analyses.

FIG. 1 is a block diagram of an environment 100 in which an example digital component distribution system 150 analyzes content of applications and distributes digital components 116 for presentation in the applications based on the analyses. As used throughout this document, the phrase "digital component" refers to a discrete unit of digital content or digital information (e.g., a video clip, audio clip, multimedia clip, image, text, or another unit of content). A digital component 116 can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement the application content. More specifically, the digital component may include digital content that is relevant to the application content (e.g., the digital component may relate to the same topic as the application content, or to a related topic). The provision of digital components by the digital component distribution system 150 can thus supplement, and generally enhance, the application content.

The digital component distribution system 150 can transmit digital components 116 to one or more client devices 110 for presentation by applications 111 operating on the client devices 110. A client device 110 is an electronic device that is capable communicating over a data communication network 120, e.g., a local area network (LAN), a wide area network (WAN), the Internet, a mobile network, or a combination thereof. Example client devices 110 include personal computers, mobile communication devices, e.g., smart phones, and other devices that can send and receive data over the network 120. A client device 110 can include various applications, such as native applications developed for a particular platform or particular device. For example, the application 111 can be a native application developed for a particular smartphone or particular mobile device operating system.

An application 111 can present content, e.g., text, images, and/or videos, to a user of a client device 110. For example, a sports news application can present news, scores, articles, highlight videos, photos taken during a sports event, or other sports-related content. An application 111 can also present digital components with the content. For example, an application page 117 of the application 111 can include a content area 118 for presenting application content (e.g., sports content) and one or more digital component slots 119 for presenting one or more digital components 116.

The application 111 can submit, over the network 120, a digital component request 115 to the digital component distribution system 150 to request digital components, e.g., to present in the digital component slots 119. As described in more detail below, the digital component request 115 can include information representative of the content displayed, or to be displayed, by the application 111.

The digital component distribution system 150 includes one or more front-end servers 152 that receive digital component requests 115 from client devices 110 and provide digital components 116 to the client devices 110 in response to the requests. The digital component distribution system 150 also includes back-end servers, including one or more application content analysis servers 160 and one or more digital component selection servers 170. The front-end server 152 can communicate with the back-end servers, e.g., over an internal data communication network, e.g., a LAN or WAN.

The application content analysis server 160 analyzes content displayed by applications 111 operating on client devices 110. For example, as described in more detail below, when an application 111 submits a digital component request 115 to the digital component distribution system 150, the digital component request 115 can include content of the application or one or more hash values for the content with which a digital component selected in response to the request will be presented. The analysis of the content can then be used to select digital components for presentation with the application content.

The application content analysis server 160 can analyze the application content to assign labels (or other data) to the content to indicate the types, categories, and/or rating of content included in the application content. For example, the application content analysis server 160 can analyze text of the application content to determine whether the text includes vulgar language, hate speech, particular words, or particular topics. For example, the application content analysis server 160 can compare words or phrases in the text to a list of vulgar words or phrases, a list of hate speech words or phrases, and/or other lists of words or phrases for which the content can be labeled. The application content analysis server 160 can then assign, to the application content, labels that indicate whether the text includes any such language or topics. For example, if the text includes a vulgar word, the application content analysis server 160 can assign, to the application content, a label "vulgar language" that indicates that the application content included vulgar language.

In some implementations, the application content analysis server 160 can analyze hash values of text to determine whether the text includes vulgar language, hate speech, particular words, or particular topics. For example, as described in more detail below, an application 111 can include a hash engine 114 that computes hash values for text using a hash function. The application 111 can include the hash values in the digital component request 115, e.g., rather than the actual text. The use of hash values can preserve the secrecy of the application content 118, since it may be difficult—if not impossible—for a party that intercepts (or otherwise receives) the digital component request 115 to derive the application content 118 from the hash values.

The application content analysis server 160 can also analyze images included in the application content. For example, the application content analysis server 160 can use object detection techniques, object recognition techniques, and or computer vision analysis on the image(s) to detect the presence of particular objects, e.g., weapons, alcohol, drugs or drug paraphernalia, etc., and/or particular types of content, e.g., blood, excessive skin, etc. The application content analysis server 160 can then assign, to the application content, labels that indicate whether the image(s) include the particular objects or particular types of content.

The application content analysis server 160 can also analyze audio content included in the application content. For example, the application content analysis server 160 can convert the audio to text, e.g., using audio transcription techniques, and analyze the converted text similar to how text included in the application content is analyzed. The application content analysis server 160 can then assign, to the application content, labels that indicate whether the audio includes any vulgar language, hate speech, particular words, or particular topics.

The application content analysis server 160 can also analyze video(s) included in the application content. For example, the application content analysis server 160 can sample one or more frames of the video and analyze each frame in a similar manner as the application content analysis server 160 analyzes images. Similarly, the application content analysis server 160 can convert audio included in the video to text and analyze the converted text in a similar manner as the application content analysis server 160 analyzes converted text for audio content. The application content analysis server 160 can then assign, to the application content, labels for each image frame and the converted text. The application content analysis server 160 can also assign, to the application content, labels based on a combination of the image(s) and converted text. For example, the application content analysis server 160 can determine that objects recognized in the image(s) and text correspond to a same topic and assign, to the application content, a label that indicates that the application content is related to the topic.

The application analysis content server 160 can also assign a rating to the application content based on the analysis of the text, image(s), audio, and/or video included in the content. For example, the application analysis content server 160 can assign ratings based on the suitability of the application content for certain audiences or certain age groups. In a particular example, the application analysis content server 160 can assign an Electronic Software Rating Board (ESRB) system rating, e.g., G, PG, Teen, or Mature, to the application content based on the words identified in the application content, objects or types of content recognized in images, etc. In another example, the ratings may be either suitable for all audiences or unsuitable for all audiences.

The application content analysis server 160 can also determine, based on the analysis of the application content, whether to include the application content in a whitelist that includes application content for which restricted digital components are eligible for presentation. As described in more detail below, a restricted digital component is a digital component that is only eligible to be presented with application content that has been included in the whitelist. For example, the application content analysis server 160 can include, in the whitelist, application content that has one or more ratings, e.g., G or PG only. Application content that is assigned a rating of Teen or higher may not be included in the whitelist. The application content analysis server 160 can assign, to application content that is whitelisted, one or more labels that indicate that the application content is whitelisted for presentation of restricted digital components.

In another example, the whitelist can include application content that has been analyzed by the application content analysis server 160 and for which one or more labels have been assigned to the application content based on the analysis. As described in more detail below, the labels can then be used to select restricted digital components that are eligible for presentation with application content that includes those labels, while not selecting restricted digital components that are not eligible for presentation with application content that includes those labels.

The application analysis content server 160 can store the application content, an identifier for the application content, an identifier for the application from which the application content was received, and/or the labels for the content in an application content data storage unit 164. The identifier for application content can include a Uniform Resource Identifier (URI) for an application page that includes the content. In another example, the identifier for the application content can be a unique key assigned to the application content, e.g., by the front-end server 152 when the application content is received or by the application content analysis server 160 when the application content is analyzed. For example, if the application content analysis server 160 determines that present content matches previous application content received from the application, the application content analysis server 160 can assign the identifier of the previous application content to the present content.

Some applications can include multiple portions of content, e.g., multiple portions of dynamic content. For example, a social networking application can generate a news feed or message feed that includes multiple messages or updates selected for the user that is logged into the social networking application. In this example, the application content application analysis server 160 can analyze each portion of content, e.g., each message or update, and assign labels to each portion of content based on the analysis. The application content application analysis server 160 can also assign a unique identifier to each portion of content and store the content, identifier, and labels for each portion of content in the application content data storage unit 164.

The application content analysis server 160 can also compute hash values of application content and/or or portions of application content. The application content analysis server 160 can use a hash function to compute the hash values of the content. For example, the analysis server 160 can use an MD5, SHA-512, SHA-256, or SHA-1 hash function or other appropriate hash function. The application content analysis server 160 can store the hash value for each portion of application content in the application content data storage unit 164. For example, the application content data storage unit 164 can include one or more tables or databases that include, for each portion of application content, a row that includes the identifier for the application content, an identifier for the application that presents the application content, a hash value for the application content, and each label assigned to the application content. An example table 165 includes, for each portion of application content, an identifier for the content, a hash value for the content, and one or more labels for the content.

The application content analysis server 160 can also compare hash values of present application content to hash values of previous application content to determine whether the content of the application has changed. For example, if the hash value determined for a present version of an application page is different from the hash value computed for a previous version of the same application page (or the hash value for multiple previous versions of the same application page), the application content analysis server 160 can determine that the content of the application page has changed. If the hash value for the present version matches a previous version, the application content analysis server 160 can determine that the content of the application page has not changed.

The digital component selection server 170 can select digital components to provide for presentation in response to digital component requests 115 received from client devices 110. The digital components can be stored in a digital components data storage unit 172. The digital components can include restricted digital components and unrestricted digital components. A restricted digital component is a digital component that is only eligible to be presented with content that is whitelisted. For example, a restricted digital component may only be eligible to be presented with content that has been assigned one or more labels indicating that the content is whitelisted for presentation of restricted digital components.

A restricted digital component can also have one or more associated selection criteria that specify content with which the restricted digital component is not eligible to be presented. For example, a digital component publisher 140 may not allow its digital components to be presented with certain types, categories, and/or ratings of content. The selection criteria for a restricted digital component can specify excluded types, categories, and/or ratings of content, such as ratings higher than PG, content that includes blood, weapons, or guns, content that includes vulgar language, etc. If the label for application content of a digital component request 115 includes excluded content for a restricted digital component, the restricted digital component will not be eligible for selection in response to the digital component request.

An unrestricted digital component is a digital component that is eligible for presentation irrespective of whether the content is whitelisted. For example, some digital component publishers 140 may allow their digital components to be presented with any type, category, or rating of content.

Restricted and unrestricted digital components can have one or more distribution criteria used by the digital component selection server 170 to select digital components to provide in response to digital component requests 115. This distribution criteria can be related to the content of the application, the application itself, data related to the client device (e.g., the geographic location or user or the client device), or other appropriate criteria. For example, a digital component publisher 140 may specify that a digital component is eligible for presentation in particular applications, with application content that includes particular keywords, or in applications operating on client devices located in particular geographic areas. As described in more detail below, the digital component selection server 170 can identify a set of eligible digital components based on whether the present application content has changed from previous application content, and then select, from the eligible digital components, one or more digital components based on the distribution criteria.

The application 111 includes an event detector 112, a content engine 113, and a hash engine 114. In some implementations, the event detector 112, content engine 113, and hash engine 114 are included in a software developer's kit (SDK). For example, an application developer can download the SDK from the digital component distribution system 150 (or another system) and include the SDK in the application 111 so that the application 111 can request digital components from the digital component distribution system 150.

The event detector 112 can detect events occurring within the application 111. The event detector 112 can detect events that are indicative of a display of content by the application 111. For example, the event detector 112 can detect screen update events for which the application 111 is going to update the screen to present content, e.g., content that is not currently being presented by the application. In a particular example, the event detector 112 can detect when an application page is being loaded or downloaded from a server. In another example, the event detector 112 can detect when webviews are created and activated. In yet another example, a pixel can be included in the webview and the event detector 112 can determine when the pixel is visible to the viewer.

When the event detector 112 detects an event that is indicative of a display of content by the application 111, the content engine 113 can send information representative of the content that is displayed (or that is going to be displayed) by the application 111 to the digital component distribution system 150. If the application 111 is going to present a digital component with the content, the content engine 113 can send the information in a digital component request that is requesting one or more digital components to present with the content.

The content engine 113 can send, as the information representative of the content, the content itself, one or more hash values for the content, or a combination of some portions of the content and one or more hash values for other portions of the content. When sending hash values, the hash engine 114 can compute the hash values based on the content using one or more hash functions. These hash functions can be the same hash functions as those used by the application content analysis server 160 so that the hash values sent by the content engine 113 can be compared to hash values computed by the application content analysis server 160.

The content engine 113 can be configured to send the actual content or hash values of the content for particular types of content. For example, some applications present sensitive or private data that the application publisher 130

(or the user) may not want to send to a third party. In a particular example, a banking application can present a user's financial data. In this example, the content engine 113 can be configured to send one or more hash values that represent the text in the application rather than the text itself so that the user's financial data is not sent to the digital component distribution system 150. Other applications, e.g., news reporting applications, may not present private or sensitive data. The content engine 113 for these applications can be configured to send the text itself rather than hash values of the text.

When sending hash values that represent text in an application 111, the hash engine 114 can compute a hash value for all of the text. The hash engine 114 can also compute a respective hash value for individual groups of words, e.g., individual pairs or words. The content engine 113 can send the hash value for all of the text and/or the hash values for the groups of text with the information representative of the content.

Some images can also include text that represents sensitive or private data. For applications that may present such images, the content engine 113 can be configured to recognize text in images, e.g., using optical character recognition (OCR) techniques. Prior to sending the image to the digital component distribution system 150, the content engine 113 can obscure the text and/or other sensitive or private data in the image, e.g., using image blurring techniques. The content engine 113 can also have the hash engine 114 compute one or more hash values for the text in the image. The content engine 113 can then include, in the information representative of the content, the blurred image and the hash value(s) for the text.

As described above, some applications, e.g., social networking applications, can include multiple portions of content, e.g., multiple portions of dynamic content. For such applications, the content engine 113 can send data for each portion of content, e.g., one or more hash values for each portion of content. In this way, the application content analysis server 160 can determine whether each portion matches a portion of content previously analyzed and assigned labels.

The content engine 113 can generate and send, to the content distribution system 150, digital component requests 115 that include the information representative of the content of the application. The digital component requests 115 can also include additional data, e.g., an identifier for the application, and identifier for the content, e.g., a URI for an application page that includes the content, contextual data, e.g., the geographic location of the client device 110, and/or other appropriate data.

When the digital component distribution system 150 receives a digital component request 115, the application content analysis server 160 can determine whether the present content represented by the data in the digital component request 115 has changed from previous content that was previously presented by the application at the client 110 device from which the digital component request was received or at another client device. To do this, the digital component distribution system 150 can compare one or more hash values for the present content to one or more hash values stored in the application content data storage unit 164.

In some implementations, the application content analysis server 160 can determine whether there is previous content for the application stored in the application content data storage unit 164. For example, the application content analysis server 160 can compare an identifier for the content to an identifier for content stored in the application content data storage unit 164. If there is a match, the application content analysis server 160 can determine whether the present content has changed from one or more previous versions of content for which data is stored in the application content data storage unit 164.

The application content analysis server 160 can determine whether the content has changed by comparing one or more hash values for the present content to one or more corresponding hash values for the previous content stored in the application content data storage unit 164. If the digital component request 115 included the present content, e.g., rather than hash value(s), the application content analysis server 160 can compute the hash value(s) for the present content. In some implementations, the application content analysis server 160 compares an overall hash value for the present content as a whole, e.g., for all of the present content, to an overall hash value for the previous content. If the hash values match, then the application content analysis server 160 can determine that the present content has not changed from the previous content. If the hash values do not match, the application content analysis server 160 can determine that the present content has changed from the previous content.

As application content can change multiple times, the application content analysis server 160 can compare the hash value(s) for the present content to corresponding hash value(s) for each of multiple previous versions of the application content that has been analyzed. For example, an application may revert to an earlier version of the content (e.g., earlier than the two most recent versions) if the more recent versions of the content is deleted. If the present content matches an older version that has been analyzed, the analysis of the older version can be used to select the digital component(s).

In some implementations, the application content analysis server 160 compares multiple hash values for the present content to multiple corresponding hash values for the previous content. For example, if the application includes multiple individual portions of content, e.g., multiple news feed posts, a hash value for each individual portion of content of the present content can be compared to a corresponding hash value for each portion of content of the previous content. If one or more hash values for the present content do not match the corresponding hash value for the previous content, the application content analysis server 160 can determine that the present content has changed from the previous content. If all of the hash values for the present content match the corresponding hash value of the previous content, the application content analysis server 160 can determine that the present content has changed from the previous content.

To illustrate, a social networking post can be presented on multiple user's news feed. This post can have an identifier that uniquely identifies the post. When the post is presented by the social networking application for a first user, the application content analysis server 160 can analyze the content of the post to assign it one or more labels and compute a hash of the content. Afterwards, the user that created the post can modify it. The modified post can then be presented to a second user. The hash value for the modified post will be different from the hash value for the original post. So, if the second user is viewing multiple posts on the user's news feed, the application content analysis server 160 will determine that this particular post has changed from its previous version based on the mismatching hash values.

Analyzing each of the individual portions of content in this manner can reduce the computational burden on the application content analysis server 160. For example, suppose that the present content is generated by combining multiple individual portions of content. Further suppose that some or all of the individual portions of content have previously been analyzed by the application content analysis server 160, but those portions are combined in a manner that has not previously been encountered by the application content analysis server 160. The need for the application content analysis server 160 to analyze the whole of the present content can be avoided by using the results of the previous analyses of some or all of the individual portions of content, thereby reducing the computational burden.

In some implementations, rather than comparing a hash value for present content to a hash value for previous content, the application content analysis server 160 can compare the actual content. However, this may be more time consuming than comparing the hash values, resulting in increased latency in providing a digital component 116 in response to a digital component request 115.

In some implementations, the application content analysis server 160 may not have an identifier for present content represented by the data in the digital component request 115. In such an example, the application content analysis server 160 can compare a hash value for the present content to the hash value for each previous content of the application 111 stored in the application content data storage unit 164. If there is a match, the labels for the matching content can be used to select digital components. If not, an unrestricted digital component can be provided in response to the digital component request 115 and the application content analysis server 160 can analyze the content and assign labels to the content based on the analysis, as described above. The labels can then be used to select restricted digital components for subsequent digital component requests for the same content.

When content is received for the first time, e.g., a new application page of an application, the application content analysis server 160 can treat the content as if it is changed content. For example, the application content analysis server 160 can analyze the content and assign labels to the content based on the analysis. The application content analysis server 160 can also compute one or more hash values for the content, as described above.

If the application content analysis server 160 determines that the present content has changed from the previous content, the digital component selection server 170 can identify a set of unrestricted digital components (rather than restricted digital components) that can be provided irrespective of whether the content is whitelisted. The digital component selection server 170 can then select one or more of the unrestricted digital components, e.g., based on selection criteria for the unrestricted digital components, to provide in response to the digital component request. This allows the digital component selection server 170 to provide a digital component without waiting for the present content to be analyzed to determine whether the present content is suitable for restricted digital components. As the present content includes unknown content which may be unsuitable for at least some digital components, restricted digital components may be ineligible until the analysis is complete. This reduces the latency in providing digital components in response to digital component requests.

If the application content analysis server 160 determines that the present content has not changed from the previous content, the digital component selection server 170 can obtain one or more labels that were assigned to the previous content based on a previous analysis of the previous content. The digital component selection server 170 can then select a set of restricted digital components that are eligible to be provided with content that includes the one or more labels. For example, if one of the labels indicate that the previous content includes alcohol, the digital component selection server 170 can select restricted digital components that are eligible to be presented with content that includes alcohol. The digital component selection server 170 can then select one or more of the restricted digital components in the set of restricted digital components to provide in response to the digital component request 115 based on selection criteria for the restricted digital components.

The digital component selection server 170 can provide the selected digital component(s) to the front-end server 152. In turn, the front-end server 152 can provide the selected digital component(s) to the client device 110 from which the digital component request 115 was received. The application 111 can present the received digital component(s), e.g., in a digital component slot, with the present content.

In the example of FIG. 1, a digital component request 115 includes an application identifier "App 1," a content identifier "page1" that identifies present content that is going to be presented by the application 111, and a hash value of "3hx9mg7" for the present content. The application content analysis server 160 can identify, in the application data storage unit 164, previous content for page 1 of App 1 as shown in the dashed box of table 165. The application content analysis server 160 can compare the hash value included in the digital component request to the hash value included in the table 165. Since the two hash values match in this example, the digital component selection server 170 can obtain the label(s) for the matching previous content, i.e., a rating of Mature and drugs. The digital component selection server 170 can then select a restricted digital component that is eligible to be presented with content that has an R rating and that includes drugs. In this example, the digital component 3 is eligible as this digital component is only excluded from being presented with content that includes hate speech or blood. The digital component 2 is also eligible as this digital component is unrestricted and can be presented with content irrespective of the type or ratings of the content. If the hash values did not match, then digital component 2 would be eligible for presentation as it is an unrestricted digital component, but digital component 3 would not be eligible as it is a restricted digital component.

The application 111 also includes a hash data storage unit 109, e.g., a hash database. After analyzing content provided by the client device 110, the digital component distribution system 150 can provide the hash(es) for the content and the label(s) for each hash to the client device 110 for storage in the hash data storage unit 109. When the application 111 sends a digital component request 115, the hash engine 114 can compare the hash(es) of the content that is presented (or going to be presented) by the application 111 to the hashes in the hash data storage unit 109. If there is a match, the content engine 113 can include, in the digital component request 115, the label(s) for each matching hash rather than the hash itself. In this way, the digital component selection server 170 can use the label(s) to select digital components rather than analyzing the hashes or content.

This also enables the application 111 to present digital components when the application 111 is offline. For example, the digital component distribution system 150 can provide, to the application 111, a set of digital components in response to a digital component request 115. For each digital component, the digital component distribution system 150 can also provide a set of rules that define when the digital component can be presented, e.g., based on the labels for the content of the application 111. When the application 111 is offline or if the bandwidth of the network 120 is low (e.g., due to the client device 110 being too great a distance from a cell tower or other network access point), the content engine 113 can use the labels for the hashes stored in the hash data storage unit 109 to determine whether a digital component can be presented and, if so, to select a digital component for presentation. The content engine 113 can also use this technique even when the application 111 is online and the bandwidth is high, e.g., to reduce latency in presenting digital components.

For example, if the hash(es) of the content that is presented by the application 111 matches corresponding hash(es) in the hash data storage unit 109, the content engine 113 can use the rules for each digital component and the labels for the hash(es) to select a digital component for presentation. If one or more hashes of the content do not match a hash stored in the hash data storage unit 109, the content engine 113 can select an unrestricted digital component or determine to not present a digital component (e.g., if no unrestricted digital components are provided in the set of digital components).

The content engine 113 can also compare the hash(es) of the content that is presented by the application 111 to the hashes in the hash data storage unit 109 to determine whether to wait for a digital component from the digital component distribution system 150. For example, if a hash of the content does not match a hash stored in the hash data storage unit 109, the content engine 113 can determine to not present a digital component as the content may need to be analyzed to assign labels to the content.

In some implementations, the client device 110 can include an on-device content analysis engine that analyzes the content of the application 111, similar to the application content analysis server 160. The on-device content analysis engine can also be included in the SDK with the event detector 112, content engine 113, and hash engine 114. The on-device content analysis engine can assign labels to the content based on the analysis. The on-device content analysis engine can be more focused or less extensive than the application content analysis server 160 so that it takes up less of the limited memory of a client device. For example, the on-device content analysis engine can analyze only text found in the content and assign labels to the text based on the analysis. In this example, the content engine 113 can send the labels to the digital component distribution system 150 with the hash of the text. For future digital component requests, the content engine 113 can similarly provide the hash and the labels for the analyzed text, e.g., to streamline the analysis performed by the application content analysis server 160.

In some implementations, the application content analysis server 160 tracks whether and/or how often content of an application changes. For example, each time the application content analysis server 160 receives a digital component request for a particular application page (or other identifiable portion of application content), the application content analysis server 160 can determine whether the content has changes, as described above. For each application page or other portion of application content, the application content analysis server 160 can maintain a count of the number of times it has changed, e.g., over a period of time. The application content analysis server 160 can then classify the application page or other portion of application content as static or dynamic based on the count, e.g., by assigning it as dynamic if the count exceeds a threshold. In another example, the application content analysis server 160 can classify the application page or other portion of application content as static if the application content analysis server 160 determined that the content has not changed over the last N (e.g., 100, 200, or another appropriate number) times that the content was analyzed.

For static application content, the application content analysis server 160 can use previously assigned labels to select digital components when the actual content of the application is not available to the application content analysis server 160 as it is less likely to have changed to include content for which digital components may be restricted. The application content analysis server 160 can perform statistical sampling to ensure that the content remains static, e.g., by analyzing the content periodically or after a threshold number of digital component requests received for the application page or other portion of application content.

Figure 2:
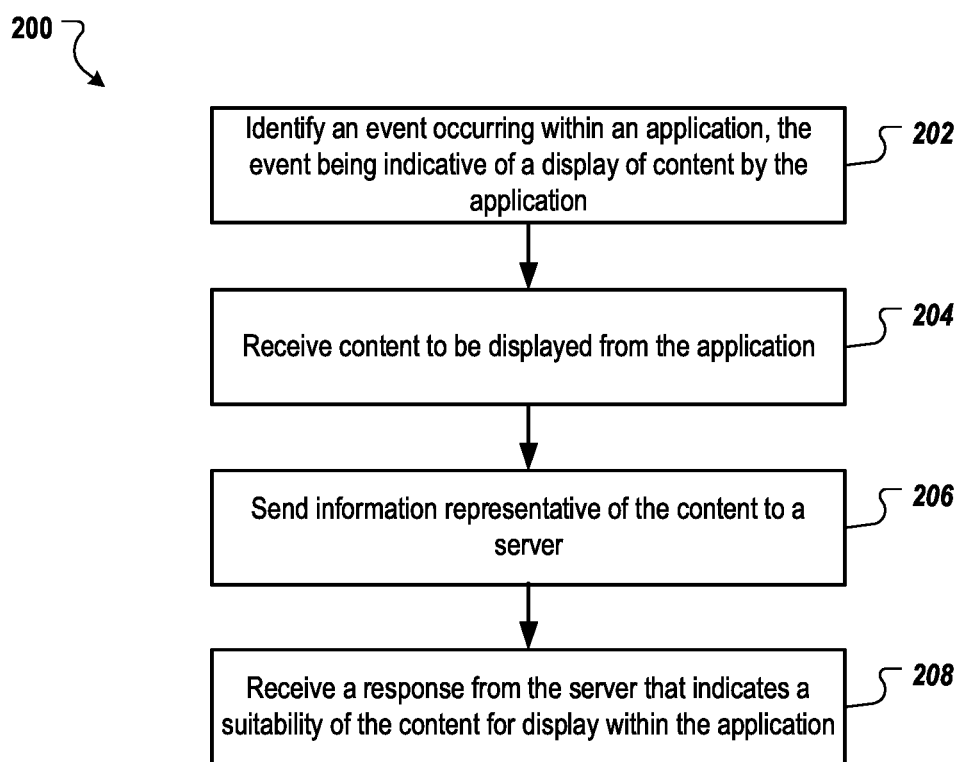
FIG. 2 is a flow diagram that illustrates an example process for obtaining a response indicative of the suitability of content to be presented by an application.

FIG. 2 is a flow diagram that illustrates an example process 200 for obtaining a response indicative of the suitability of content to be presented by an application. The process 200 can be implemented, for example, by the client device 110 of FIG. 1. Operations of the process 200 can also be implemented as instructions stored on non-transitory computer readable media, and execution of the instructions by one or more data processing apparatus can cause the one or more data processing apparatus to perform the operations of the process 200.

An event occurring within an application 111 is identified (202). The event can be indicative of a display of content by the application that is operating on the client device 110. The event indicative of the display of content by the application can be a screen update event in which the application is updating the screen to present content that was not previously being presented by the application. For example, the event can be initiated by a user request to refresh the content to present updated content (e.g., updated social networking content or updated sporting event scores) or a user request to download and present a different application page than the application page currently being presented. As described above, the event can be detected by an SDK included in the application. In another example, the application can include code that provides, to the SDK, data indicating that the event is occurring.

Content to be displayed is received from the application (204). For example, an SDK of the application or a different application operating on the same client device can obtain the content that is to be displayed by the application. The SDK can include a script or a wrapper function that obtains the content when the content is supplied to the application.

Information representative of the content is sent to a server, e.g., the digital component distribution system 150 or any of its constituent servers 152, 160, 170 (206). The information can be sent in response to identifying the event occurring within the application. As described above, the information representative of the content can include the content itself, hash values computed based on the content, or a combination thereof. For example, the information representative of the content can include images, audio, and/or video of the content. For text, the information representative of the content can include the text itself or one or more hash values computed based on the text, e.g., for the text as a whole and/or for individual groups of text.

A response is received from the server (208). The response indicates a suitability of the content for display within the application. For example, the server can analyze the information representative of the content and assign labels to the content based on the analysis. As described above, the labels can indicate the types, categories, and/or rating of content included in the application content.

Additional operations can be performed based on the response received from the server. For example, the application (or the SDK of the application) can prevent the display of the content within the application when the response indicates that the content is not suitable for display. In a particular example, if the content is assigned a rating of Mature and the user of the application is under a particular age, e.g., 18, the application can prevent the display of the content. In another example, if the response indicates that the content includes particular types of content, e.g., malicious code or hate speech, the application can prevent the display of the content.

Additional content can be received for display within the application when the response indicates that the content is suitable for display within the application. For example, the server can identify one or more restricted digital components to present within the application based on the analysis of the content as described above. The server can provide the identified digital component(s) to the application, e.g., with the response. The application can present the digital component(s) with the content.

Figure 3:
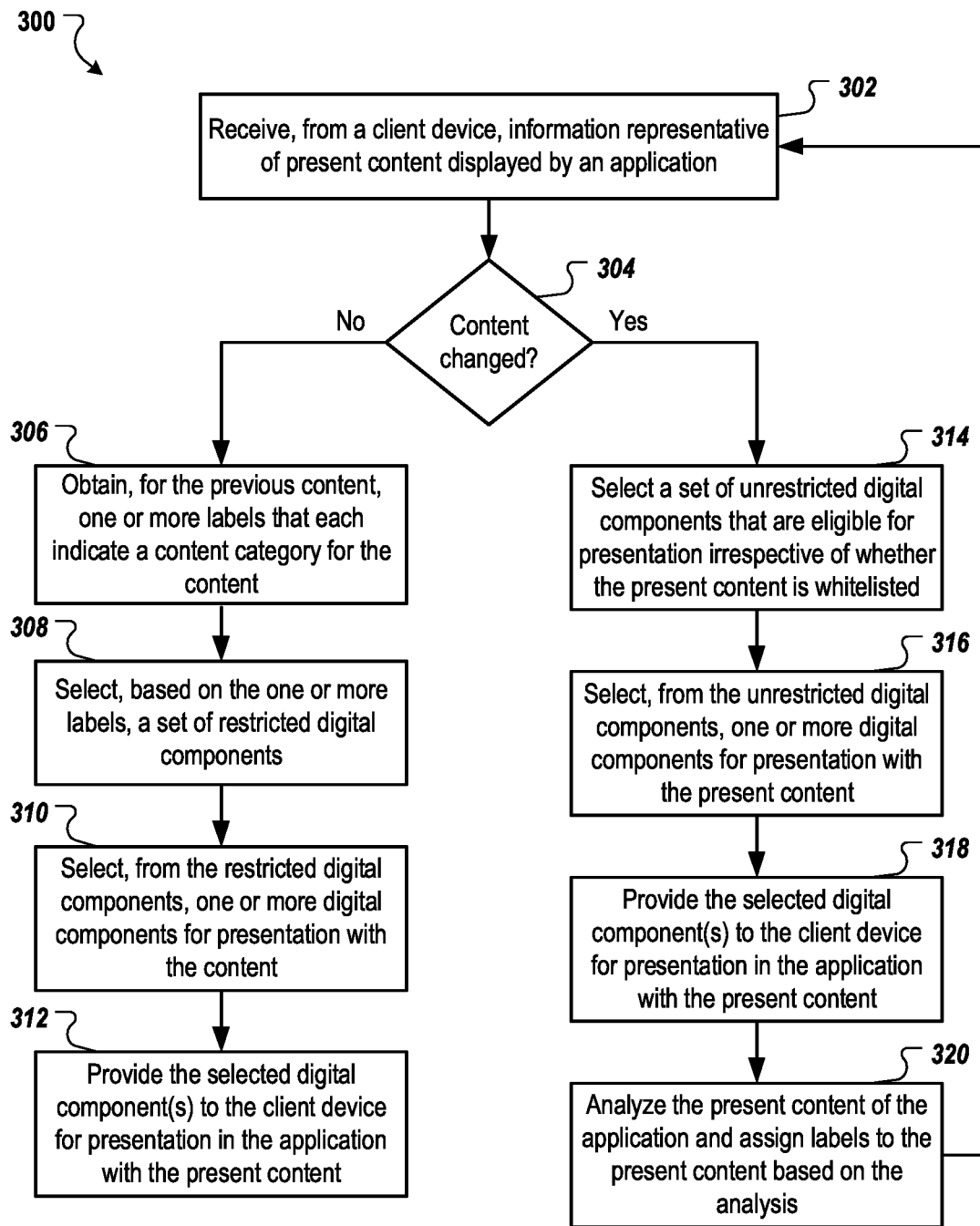
FIG. 3 is a flow diagram that illustrates an example process for selecting and providing digital components for presentation by an application based on content displayed by the application.

FIG. 3 is a flow diagram that illustrates an example process 300 for selecting and providing content for presentation by an application based on other content to be presented by the application. The process 300 can be implemented, for example, by the digital component distribution system 150 of FIG. 1. Operations of the process 300 can also be implemented as instructions stored on non-transitory computer readable media, and execution of the instructions by one or more data processing apparatus can cause the one or more data processing apparatus to perform the operations of the process 300.

Information representative of present content displayed by an application is received from a client device 110 (302). The present content can be content that is currently presented by the application 111 or that is going to be presented, e.g., in response to an event that is occurring in the application. As described above, the information representative of the content can include the content itself, hash values computed based on the content, or a combination thereof.

The content of the application may not be directly accessible outside of the application. For example, the content may be customized for a particular user that is logged into the application, e.g., by the application itself. In a particular example, the content can include social networking posts selected for presentation to the user logged into the application. In another example, the content may be updated frequently such that obtaining the content in advance would not be representative of the content that is being presented. For example, the content can include stock quotes, sports scores, or news content that can change throughout the day.

A determination is made whether the present content displayed by the application has changed from previous content that was previously presented by the application at one or more client devices (304). For example, the same content can be presented to multiple users at different client devices. Some dynamic content may change over time such that the content presented by the application at one client device may different from the content presented by the application at another client device. Some content may be customized based on the user logged into the application such that the content is different for different users.

As described above, one or more hash values can be computed for the previous content and for the present content. The hash values can be compared to each other to determine whether the present content has changed from the previous content. For example, an overall hash value can be computed for the present content and an overall hash value can be computed for the previous content. If the hash values match, then the present content has not changed from the previous content, i.e., the present content matches the previous content. If the hash values do not match, the present content has changed from the previous content, i.e., the present content does not match the previous content.

A response is made based on whether the present content has changed from the previous content. If the present content has not changed from the previous content, operations 306-312 are performed. If the present content has changed from the previous content, operations 314-320 are performed.

In response to determining that the present content has not changed from the previous content, one or more labels for the previous content are obtained (306). The one or more labels can be assigned to the previous content based on a previous analysis of the previous content. For example, the information representative of the previous content may have been received from the application prior to the present content being received. The information representative of the previous content can be analyzed, as described above, and the one or more labels can be assigned to the previous content based on the analysis.

As described above, each label can indicate a category, type, or rating to which at least a portion of the previous content was assigned based on the analysis. The one or more labels can also include a label that indicates whether the previous content is whitelisted for presentation of restricted digital components.

A set of restricted digital components are selected based on the one or more labels (308). A restricted digital component is a digital component that is only eligible to be presented with content that has been assigned one or more labels that indicate that the content is whitelisted for presentation of restricted digital components. Each restricted digital component can be associated with one or more selection criteria that indicate categories, types, and/or ratings of content with which the digital component is prohibited from being presented. The one or more labels can be compared to the selection criteria to select the set of restricted digital components. For example, each restricted digital component that has selection criteria that indicate that the restricted digital component is eligible to be presented with content that is assigned the one or more labels of the previous content can be selected for inclusion in the set of restricted digital components. If a restricted digital component includes selection criteria that indicate that the restricted digital component is not eligible for presentation with content specified by one of the labels for the previous content, the restricted digital component may not be included in the set of restricted digital components.

One or more digital components are selected for presentation with the content (310). The one or more digital components can be selected from the set of restricted digital components. For example, the one or more digital components can be selected based on distribution criteria related to the present content of the application, the application itself, data related to the client device (e.g., the geographic location or user or the client device), or other appropriate criteria.

The selected digital component(s) are provided to the client device for presentation in the application with the present content (312). The application can receive the digital component(s) and present the digital component(s) with the present content of the application, e.g., in one or more digital component slots of the application.

Returning to operation 304, in response to determining that the present content has changed from the previous content, a set of unrestricted digital components are selected (314). Each unrestricted digital component is a digital component that is eligible for presentation irrespective of whether the present content is whitelisted. For example, an unrestricted digital component may not have any restrictions on the types, categories, or ratings of content with which the unrestricted digital component can be presented. Thus, an unrestricted digital component can be presented with any application content.

One or more digital components are selected, from the set of unrestricted digital components, for presentation with the present content (316). Similar to the restricted digital components, the unrestricted digital component(s) can be selected based on distribution criteria related to the present content of the application, the application itself, data related to the client device (e.g., the geographic location or user or the client device), or other appropriate criteria.

The selected digital component(s) are provided to the client device for presentation in the application with the present content (318). The application can receive the digital component(s) and present the digital component(s) with the present content of the application, e.g., in one or more digital component slots of the application.

The present content of the application is analyzed (320). As the present content is different from the previous content, the present content can be analyzed to assign the present content one or more labels that indicate the types, categories, and rating of the present content. The present content can also be analyzed to assign the present content a label that indicates that the present content is whitelisted for presentation of restricted content. In this way, if the same content is received later, the labels can be used to select digital components as described in operations 306-312. This allows restricted digital components to be provided in response to receiving information representative of the same content with reduced latency as the content has already been analyzed and assigned label(s).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method performed by one or more data processing apparatus, the method comprising:
   receiving information representative of a content portion of a social networking feed for a user;
   determining, based on the information representative of the content portion, whether the content portion has changed from a previous version of the content portion;
   in response to determining that the content portion has not changed from the previous version of the content portion,
      selecting a first digital component for presentation with the content portion based on a previous analysis of the previous version of the content portion, and
      providing the first digital component to a client device of the user for presentation with the content portion; and
   in response to determining that the content portion has changed from the previous version of the content portion,
      selecting, from a set of unrestricted digital components, a second digital component for presentation with the content portion, and
      providing the second digital component to the client device for presentation with the content portion.

2. The method of claim 1, wherein the information representative of the content portion comprises hash value generated based on the content portion.

3. The method of claim 2, wherein determining, based on the information representative of the content portion, whether the content portion has changed from a previous version of the content portion comprises comparing the hash value generated based on the content portion to one or more previous hash values that each represent a previous version of the content portion.

4. The method of claim 1, wherein selecting the first digital component for presentation with the content portion based on the previous analysis of the previous version of the content portion comprises selecting the first digital component based on one or more categories and/or one or more ratings assigned to the content portion based on the previous analysis.

5. The method of claim 4, wherein selecting the first digital component based on the one or more categories and/or the one or more ratings assigned to the content portion based on the previous analysis comprises selecting the first digital component based on the one or more categories assigned to the content portion matching at least one category of selection criteria for the first digital component.

6. The method of claim 4, wherein selecting the first digital component based on the one or more categories and/or the one or more ratings assigned to the content portion based on the previous analysis comprises selecting the first digital component based on the one or more ratings assigned to the content portion satisfying a rating criterion for the first digital component.

7. The method of claim 1, further comprising, in response to determining that the content portion has changed from the previous version of the content portion, analyzing the content portion and assigning one or more categories to the content portion based on the analyzing.

8. The method of claim 1, wherein the social networking feed comprises multiple distinct content portions including the content portion and each distinct content portion has a corresponding identifier, the method further comprising:
    determining, using the identifiers for the distinct content portions, whether each distinct content portion has changed from previous versions of the distinct content portions; and
    selecting digital components for display with the social networking feed based on the determination of whether each distinct content portion has changed from previous versions of the distinct content portions.

9. The method of claim 1, wherein the content portion comprises a social networking message displayed in the social networking feed.

10. The method of claim 1, wherein the social networking feed is displayed by a social networking application.

11. A system comprising:
    a data processing apparatus; and
    a memory storage apparatus in data communication with the data processing apparatus, the memory storage apparatus storing instructions executable by the data processing apparatus and that upon such execution cause the data processing apparatus to perform operations comprising:
        receiving information representative of a content portion of a social networking feed for a user;
        determining, based on the information representative of the content portion, whether the content portion has changed from a previous version of the content portion;
        in response to determining that the content portion has not changed from the previous version of the content portion,
            selecting a first digital component for presentation with the content portion based on a previous analysis of the previous version of the content portion, and
            providing the first digital component to a client device of the user for presentation with the content portion; and
        in response to determining that the content portion has changed from the previous version of the content portion,
            selecting, from a set of unrestricted digital components, a second digital component for presentation with the content portion, and
            providing the second digital component to the client device for presentation with the content portion.

12. The system of claim 11, wherein the information representative of the content portion comprises hash value generated based on the content portion.

13. The system of claim 12, wherein determining, based on the information representative of the content portion, whether the content portion has changed from a previous version of the content portion comprises comparing the hash value generated based on the content portion to one or more previous hash values that each represent a previous version of the content portion.

14. The system of claim 11, wherein selecting the first digital component for presentation with the content portion based on the previous analysis of the previous version of the content portion comprises selecting the first digital component based on one or more categories and/or one or more ratings assigned to the content portion based on the previous analysis.

15. The system of claim 14, wherein selecting the first digital component based on the one or more categories and/or the one or more ratings assigned to the content portion based on the previous analysis comprises selecting the first digital component based on the one or more categories assigned to the content portion matching at least one category of selection criteria for the first digital component.

16. The system of claim 14, wherein selecting the first digital component based on the one or more categories and/or the one or more ratings assigned to the content portion based on the previous analysis comprises selecting the first digital component based on the one or more ratings assigned to the content portion satisfying a rating criterion for the first digital component.

17. The system of claim 11, wherein the operations comprise, in response to determining that the content portion has changed from the previous version of the content portion, analyzing the content portion and assigning one or more categories to the content portion based on the analyzing.

18. The system of claim 11, wherein the content portion comprises a social networking message displayed in the social networking feed.

19. The system of claim 11, wherein the social networking feed is displayed by a social networking application.

20. A non-transitory computer storage medium encoded with a computer program, the program comprising instructions that when executed by a data processing apparatus cause the data processing apparatus to perform operations comprising:
    receiving information representative of a content portion of a social networking feed for a user;
    determining, based on the information representative of the content portion, whether the content portion has changed from a previous version of the content portion;
    in response to determining that the content portion has not changed from the previous version of the content portion,
        selecting a first digital component for presentation with the content portion based on a previous analysis of the previous version of the content portion, and
        providing the first digital component to a client device of the user for presentation with the content portion; and in response to determining that the content portion has changed from the previous version of the content portion,
selecting, from a set of unrestricted digital components, a second digital component for presentation with the content portion, and
providing the second digital component to the client device for presentation with the content portion.

\* \* \* \* \*